United States Patent
Panek et al.

(10) Patent No.: US 7,053,154 B2
(45) Date of Patent: *May 30, 2006

(54) IMPACT MODIFIED POLYOLEFIN COMPOSITIONS

(75) Inventors: Ann M. Panek, Brunswick, OH (US); Anna C. Andrews, Medina, OH (US); Haleh Ayrom-Keuchel, Copley, OH (US); Paul J. DeFranco, Twinsburg, OH (US); Robert J. Opalko, Middleburg Heights, OH (US)

(73) Assignee: Ferro Corporation, Cleveland, OH (US)

( * ) Notice: Subject to any disclaimer, the term of this patent is extended or adjusted under 35 U.S.C. 154(b) by 170 days.

This patent is subject to a terminal disclaimer.

(21) Appl. No.: 10/668,615

(22) Filed: Sep. 23, 2003

(65) Prior Publication Data

US 2004/0110881 A1    Jun. 10, 2004

Related U.S. Application Data

(60) Provisional application No. 60/414,137, filed on Sep. 27, 2002.

(51) Int. Cl.
 C08F 8/00    (2006.01)
 C08L 23/00   (2006.01)
 C08L 23/04   (2006.01)
 C08L 33/06   (2006.01)
 C09B 67/00   (2006.01)

(52) U.S. Cl. ............... 525/191; 525/240; 524/560
(58) Field of Classification Search ........... 525/191, 525/240; 524/560
See application file for complete search history.

(56) References Cited

U.S. PATENT DOCUMENTS

| | | | |
|---|---|---|---|
| 4,098,752 A | 7/1978 | Ohkawa et al. | |
| 4,349,601 A | 9/1982 | Brueggemann et al. | |
| 4,415,691 A | 11/1983 | Allen et al. | |
| 4,954,291 A | 9/1990 | Kobayashi et al. | |
| 5,015,684 A | 5/1991 | Kobayashi et al. | |
| 5,115,004 A | 5/1992 | Mochizuki et al. | |
| 5,308,395 A | 5/1994 | Burditt et al. | |
| 5,317,051 A | 5/1994 | Harashige et al. | |
| 5,331,022 A * | 7/1994 | Jochmann et al. | 523/136 |
| 5,962,092 A | 10/1999 | Kuo et al. | |
| 6,011,086 A | 1/2000 | Grant et al. | |
| 6,025,075 A | 2/2000 | Grant et al. | |
| 6,028,016 A | 2/2000 | Yahiaoui et al. | |
| 6,160,048 A | 12/2000 | Uyeda et al. | |
| 2001/0014384 A1 | 8/2001 | Kishine | |
| 2003/0124286 A1 | 7/2003 | Kijima | |

OTHER PUBLICATIONS

U.S. Appl. No. 10/668,041, filed Sep. 22, 2003.

* cited by examiner

Primary Examiner—Nathan M. Nutter
(74) Attorney, Agent, or Firm—Rankin, Hill, Porter & Clark LLP

(57) ABSTRACT

The present invention provides polyolefin compositions that exhibit both stiffness and toughness. Polyolefin compositions according to the invention include a polyolefin homopolymer resin such as polypropylene and an impact modifying fluid that includes a nonionic surfactant and optionally a diluent such as mineral oil. The nonionic surfactant can be an ethoxylated sorbitan fatty acid ester such as ethoxylated sorbitan trioleate. Unfilled impact modified polypropylene homopolymer formed in accordance with the invention preferably exhibits a Gardner impact strength of at least 100 in-lbs, a flexural modulus of at least 40 kpsi and a tensile modulus of at least 60 kpsi.

13 Claims, 5 Drawing Sheets

FIGURE 1. EXTRUDER SETUP

IMPACT MODIFIED POLYOLEFIN COMPOSITIONS

BACKGROUND OF THE INVENTION

1. Field of Invention

The present invention relates to polyolefin compositions, and more particularly, to polyolefin compositions comprising an impact modifying fluid.

2. Description of Related Art

In many applications it is possible to replace relatively expensive engineering resins such as acrylonitrile-butadiene-styrene (ABS) with lower cost commodity resins such as polypropylene homopolymer by incorporating various fillers and/or reinforcing materials into the commodity resins. It is well known that incorporating such fillers into commodity resins such as polypropylene homopolymer tends to increase the stiffness of the material, but it also tends to decrease the impact strength of the material. The tradeoff between stiffness and toughness is well known in the art of filled and reinforced polyolefins.

The prior art uses a variety of approaches to increase the impact strength of polyolefins. Polypropylene homopolymer is sometimes blended with about 30% or more by weight of one or more rubbery copolymers comprising at least one alpha olefin such as ethylene and propylene or ethylene and octene, which are typically formed using metallocene catalysts. Blends of polyolefin homopolymers and rubbery copolymers exhibit higher Gardner impact strength than polyolefin homopolymers alone, but there is a significant loss in flexural modulus. Moreover, because rubbery copolymers are relatively expensive and are used in large quantities, this approach to impact modification adds significant cost to the material.

Another prior art approach to impact modification is to add about a 20% by weight loading of calcium carbonate to the molten polypropylene. Polypropylenes modified in this manner can achieve Gardner impact strength values that approach 100 in-lbs while maintaining a flexural modulus of about 250 kpsi. Adding fiberglass to polypropylene can increase the flexural modulus of the material to about 550 kpsi, but the Gardner impact strength of the material is only about 10 in-lbs. Although this approach to impact modification is less expensive than the use of rubbery copolymers, the use of calcium carbonate and/or glass fiber to modify the impact of polyolefins increases the density of the material, and thus the weight of molded parts, which is undesirable in some applications such as in automotive and packaging applications.

BRIEF SUMMARY OF THE INVENTION

The present invention provides polyolefin compositions that exhibit both stiffness and toughness. Impact modified polyolefin compositions according to the invention comprise a polyolefin resin such as, for example, polypropylene homopolymer, and an impact modifying fluid comprising a nonionic surfactant and, optionally, a diluent.

Impact modified commodity grade polypropylene homopolymer in accordance with the invention preferably exhibits a Gardner impact strength at 23° C., of at least 100 in-lbs (ASTM D 5420), a flexural modulus of at least 150 kpsi (ASTM D 790), and a tensile modulus of at least 150 kpsi (ASTM D 638). Impact modified polyolefin compositions according to the invention can be used in place of relatively expensive engineering resins in a variety of applications including, for example, the production of automotive parts. The impact modifying fluid in accordance with the invention does not significantly increase the density of the polyolefin composition like conventional fillers such as calcium carbonate and glass fibers do, and thus can be used to form molded parts that weigh less than conventional impact modified molded parts.

The foregoing and other features of the invention are hereinafter more fully described and particularly pointed out in the claims, the following description setting forth, in detail, certain illustrative embodiments of the invention, these being indicative, however, of but a few of the various ways in which the principles of the present invention may be employed.

DETAILED DESCRIPTION OF THE INVENTION

Figure 1:
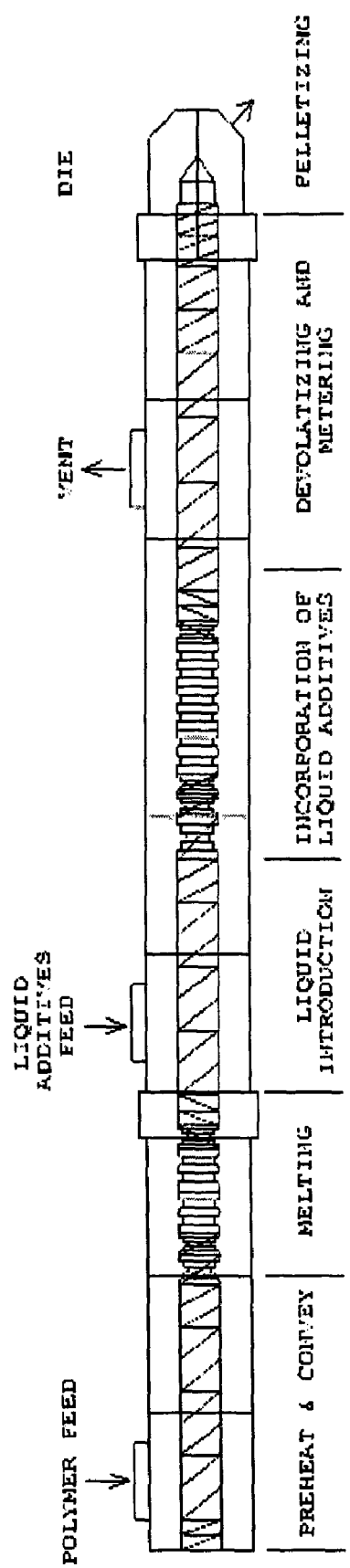
FIG. 1 shows a schematic side view of an extruder set up in accordance with the invention.

Any polyolefin homopolymer can be used in the present invention. Suitable polyolefin homopolymers include, but are not limited to, polyethylene and polypropylene. Commodity grade polypropylene homopolymer is presently most preferred. Polypropylene homopolymers are typically sold in isotactic form, but other forms (e.g., syndiotactic) can also be used. The polyolefin composition may further comprise minor amounts of other polymers including, for example, rubbery copolymers of alpha olefins such as propylene and ethylene or ethylene and octene. As used herein and in the appended claims, the term "minor amount" means less than 15% by weight.

The melt flow index ("MFI") of the polyolefin homopolymers used in the invention is preferably within the range of from about 0.5 g/10 min to about 30 g/10 min, and more preferably within the range of from about 1.0 g/10 min to about 14 g/10 min. The melt flow index of a polymer is generally inversely proportional to its molecular weight. Thus, the higher the molecular weight, the lower the melt flow rate, although this relationship is not linear. Greater improvements in impact strength are observed in lower melt flow index polyolefin homopolymers (e.g., 4 MFI polypropylene homopolymer) as compared to higher melt flow index polyolefin homopolymers (e.g., 12 MFI polypropylene homopolymer).

The impact modifying fluid comprises a nonionic surfactant and optionally a diluent. The nonionic surfactant preferably includes a fatty acid tail and a polar head, and most preferably, some type of ring structure. The diluent is preferably mineral oil and/or polybutene.

Specific examples of suitable nonionic surfactants for use in the invention include ethoxylated ethers (e.g., polyoxyethylene (23) lauryl ether and polyoxyethylene (10) oleyl ether, which are available from ICI Americas, Inc. as BRIJ 35 and BRIJ 97, respectively), ethoxylated alkylphenols (e.g., nonylphenol ethoxylate, which is available from Huntsman Petroleum Corporation as SURFONIC N-60, and polyoxyethylene octylphenol ether, which is available from Dow Surfactants as TRITON X-100), ethoxylated aryl phenols (e.g., ethoxylated polyarylphenol phosphate ester, which is available from Rhodia Chemical as SOPROPHOR 3D33) and ethoxylated sorbitan fatty acid esters, which are available in a variety of types from a variety of manufacturers under a variety of trade names (e.g., polyoxyethylene sorbitan monolaurate, which is available from the Uniqema division of ICI Americas, Inc. as TWEEN 20, from BASF Corporation as T-MAZ 20, and from Specialty Industrial Products, Inc. as POLISORBAC 20, polyoxyethylene sorbitan monopalmitate, which is available from the Uniqema division of ICI Americas, Inc. as TWEEN 40 and from Specialty Industrial Products, Inc. as POLISORBAC 40, polyoxyethylene sorbitan monostearate, which is available from the Uniqema division of ICI Americas, Inc. as TWEEN 60 and from Specialty Industrial Products, Inc. as POLISORBAC 60, polyoxyethylene sorbitan tristearate, which is available from the Uniqema division of ICI Americas, Inc. as TWEEN 65, from BASF Corporation as T-MAZ 65, and from Specialty Industrial Products, Inc. as POLISORBAC 65, polyoxyethylene sorbitan monooleate, which is available from the Uniqema division of ICI Americas, Inc. as TWEEN 80, from BASF Corporation as T-MAZ 80, and from Specialty Industrial Products, Inc. as POLISORBAC 80, and polyoxyethylene sorbitan trioleate, which is available from the Uniqema division of ICI Americas, Inc. as TWEEN 85, from BASF Corporation as T-MAZ 85, and from Specialty Industrial Products, Inc. as POLISORBAC 85).

Ethoxylated sorbitan fatty acid esters, which are typically obtained via the esterfication of sorbitol with one or three molecules of a fatty acid (typically stearic, lauric, oleic, or palmitic) under conditions that cause the splitting out of water from the sorbitol leaving sorbitan, are presently most preferred for use in the invention in view of factors such as performance and cost. Polyoxyethylene sorbitan trioleate ("ESTO") is the presently most preferred ethoxylated sorbitan fatty acid ester for use in the invention.

Notwithstanding the foregoing, different nonionic surfactants may be more optimal depending upon the properties desired in the resulting impact modified polyolefin composition. The Table 1 below lists the three nonionic surfactants that provided the best performance on seven test properties:

TABLE 1

Break Strain % polyoxyethylene (20) sorbitan tristearate
polyoxyethylene (20) sorbitan monolaurate
polyoxyethylene (20) sorbitan monooleate
Gardner Impact Strength at 23° C.

polyoxyethylene (20) sorbitan trioleate
Sorbitan trioleate
polyoxyethylene (20) sorbitan monolaurate TABLE 1-continued Flexural Modulus polyoxyethylene (20) sorbitan trioleate
polyoxyethylene (80) sorbitan monolaurate
polyoxyethylene (20) sorbitan monolaurate
polyoxyethylene (20) sorbitan monooleate
sorbitan trioleate
(Note: all three provided similar results)
Tensile Strength sorbitan trioleate
polyoxyethylene (20) sorbitan trioleate
polyoxyethylene (80) sorbitan monolaurate
Melt Flow Index polyoxyethylene (20) sorbitan monooleate
polyoxyethylene (20) sorbitan monolaurate
polyoxyethylene (20) sorbitan tristearate
Flexural Strength polyoxyethylene (20) sorbitan trioleate
sorbitan trioleate
polyoxyethylene (80) sorbitan monolaurate
Tensile Modulus Polyoxyethylene (5) sorbitan monooleate
polyoxyethylene (20) sorbitan trioleate
sorbitan trioleate Although the impact modifying fluid can comprise only a nonionic surfactant, in some applications the impact modifying fluid can further optionally comprise a diluent such as mineral oil. Applicants surprisingly discovered that while adding an ethoxylated sorbitan fatty acid ester to a molten polyolefin tends to result in a polymer composition that exhibits increased impact strength and a surprisingly small loss in flexural modulus, the improvement in impact strength and flexural modulus is greatest when the ethoxylated sorbitan fatty acid ester is mixed with a diluent such as mineral oil. Some synergy (the mechanism is as yet unknown) occurs when these materials are used in combination. This conclusion is based upon test data that shows that the loss of flexural modulus accompanying a 1 in-lb increase in Gardner impact strength is lower for the combination of an ethoxylated sorbitan fatty acid ester and mineral oil than it is for mineral oil used alone (see, e.g., Examples 1–4 below).

The preferred diluent component of the impact modifying fluid is mineral oil. Mineral oil comes in many grades and types. White or light mineral oil is presently preferred for use in the invention. Mineral oil of this type consists of a complex mixture of straight and branched chain saturated hydrocarbons and cyclic saturated hydrocarbons. The concentration and molecular weights of the various constituents of the mineral oil determine the physical characteristics of the mineral oil, such as viscosity. Presently, mineral oil having a viscosity of from about 6 to about 500 centistokes at 40° C., and more preferably about 75 to about 500 centistokes at 40° C., is preferred.

An alternative diluent to mineral oil is polybutylene, which is also known as in the art as polybutene. A variety of polybutenes are available from British Petroleum under the INDOPOL tradename. Applicants have determined that INDOPOL L-14, H-7, and H-100, for example, can be blended in varying amounts with ESTO to form an effective impact modifying fluid for polyolefins. Other polymers that are liquids at ambient temperatures (e.g., 20–25° C.) can also be used as diluents in the invention.

Depending upon the desired mechanical properties, the impact modifying fluid can be 100% nonionic surfactant or a blend of any weight ratio of nonionic to diluent. Some preferred impact modifying fluids comprise from about 5% to about 99% by weight of an ethoxylated sorbitan fatty acid ester, with the balance being diluent (i.e., the weight ratio of ethoxylated sorbitan fatty acid ester to diluent is from about 5:95 to about 99:1). The materials can be blended or mixed together easily at virtually any ratio using conventional mixing equipment such as a Cowles mixer.

The amount of the impact modifying fluid that can be added to the polyolefin is relatively high, with loadings as high as 35% by weight being feasible without any difficulty. Throughout the instant specification and in the appended claims, the phrase "by weight" shall be understood as meaning by weight of all components of the polyolefin composition, unless otherwise clearly indicated. However, applicants have discovered that at high loadings of the impact modifying fluid (e.g., greater than 20% by weight), the impact-modified polyolefin composition will exhibit unusual characteristics such as visible spherulite fronts and transparent skins overlying opaque white cores. Loadings of from about 2% by weight to about 8% by weight are preferred.

It will be appreciated that the impact modifying fluid can be added to the molten polyolefin at any point. With reference to FIG. 1, which shows a schematic side view of an extruder, the impact modifying fluid is preferably added to the molten polyolefin near the feed throat of an extruder using a peristaltic pump and plastic/copper tubing. It will be appreciated that the impact modifying fluid can be added at one inlet or at several inlets and can be used in single and twin screw extruders.

Polyolefin compositions according to the invention may further comprise one or more additives such as are typically used in polyolefin compositions. Suitable additives include, for example, antioxidants, UV stabilizers, flame retardant additives, pigments and colorants and particulate fillers and fibers. Although conventional additives can be used in the polyolefin compositions according to the invention, it should be noted that the improved impact resistance properties are adversely affected when the polyolefin compositions comprise a significant quantity of solid particles having a $D_{50}$ that is greater than about 1.0 µm. In such cases, the mechanical properties provided by the filler dominate and thereby mask any benefits that might otherwise be attributable to the impact modifying fluid. In other words, impact modification is not additive in such systems. Accordingly, in order to maintain the improvements in low temperature impact resistance provided by the nonionic surfactant, any solid particles present in the polyolefin compositions according to the invention should be very small, which is hereby defined as having a $D_{50}$ of less than about 1.0 µm.

The principal advantage provided by the present invention is that tremendous improvements in the impact strength of polyolefin compositions can be obtained at the expense of a relatively small sacrifice in stiffness. Thus, polyolefin homopolymers can be impact modified in accordance with the invention so as to retain virtually all of their desirable stiffness properties, but exhibit room temperature impact strength properties that were heretofore only achievable through the use of costly copolymers (e.g., metallocene copolymers) or through the use of additives that make the polymers very dense.

Use of a nonionic surfactant as an impact modifying fluid provides another unexpected yet highly desirable advantage. It is known that conventional polyolefin compositions sometimes release volatile components when exposed to heat. In automotive applications, the volatile components sometimes condense on the interior surface of glass windshields thereby creating a haze or fog. It is believed that some of the constituents of mineral oils and other diluents used to improve low temperature impact strength in such compositions may contribute to the "fogging" problem.

Surprisingly, the use of nonionic surfactants, and particularly ethoxylated sorbitan fatty acid esters, as impact modifying fluids tends to reduce the degree of "fogging" observed in molded polyolefin compositions. It is theorized that the nonionic surfactants "bind up" the oligomers, which prevents them from exuding to the surface of the part. This allows for use of "wide spec" materials in applications where the part is to be painted. This provides additional cost savings. If oil is going to be included in the composition, then a non-volatile oil such as PARALUX 6001 or DRAKEOL 34 should be used to reduce the likelihood of fogging.

Additional advantages provided by use of the impact modifying fluid according to the invention include an improvement in elongation at break. In other words, impact modified polyolefin compositions in accordance with the invention will stretch somewhat before breaking and are thus less brittle (ductile failure) than conventional polyolefin compositions. The impact modifying fluid is significantly less dense than calcium carbonate and glass fiber, and thus molded parts formed from impact modified polyolefin compositions according to the invention will generally weigh less than conventional molded parts.

Injection-molded parts formed from the impact modified polyolefin composition according to the invention exhibit reduced permanent stress whitening upon flex. Thus, molded parts that include hinges will not whiten or show wear as readily as parts formed from conventional homopolymers. Impact polyolefin compositions according to the invention are often not colored or lightly colored, which makes the improvements in permanent stress whitening upon flex highly advantageous.

The impact modifying fluid can be mixed with the molten polymer using conventional polymer processing equipment, and provides improved properties at lower cost without the use of hazardous materials. Those having skill in the art would expect that adding the impact modifying fluid according to the invention would lead to plasticization of the polyolefin composition rather than impact modification. The mechanism achieved by the present invention is clearly not plasticization. Impact modified polyolefin compositions according to the invention retain substantial tensile strength and toughness, but exhibit surprisingly improved impact strength at low temperatures. The improvement in impact strength without a corresponding degradation in tensile strength is substantially better than that previously observed in plasticized systems.

The exact mechanism by which the impact modifying fluid increases the impact strength of polyolefins is not presently known. One theory for increasing the impact strength of a polymer composition is to give the polymer chains greater freedom to move: the greater the freedom to move, the greater the ability of the polymer to dissipate energy, and thus the higher the impact strength of the material. The addition of an impact modifying fluid in accordance with the invention very clearly increases the viscous properties of the polyolefin composition. Adding the impact modifying fluid to polyolefins decreases glass transition temperature ($T_g$) and increases the loss modulus and tan δ (which is a ratio of lost to stored energy), which increases in the mobility of the polymer chains molecules at $T_g$.

The presence of the impact modifying fluid tends to reduce the degree of crystallinity in the polyolefin composition. The impact modifying fluid also has an effect on crystallite size, nucleation density, and the thickness of the skin layer in injection-molded parts, which contribute to the improvements in Gardner impact strength observed in the material. Transmission electron microscope images of samples stained with ruthenium (which partitions into ESTO and mineral oil, but not into polypropylene) indicate condensed structures that are approximately spherical with diameters within the range of from about 4 to about 300 nm (see Example 6).

Notwithstanding the foregoing, the addition of the impact modifying fluid to a polyolefin composition does not always have the same effect on the crystallite size, nucleation density, and the thickness of the skin layer in the injection molded parts. For example, addition of the impact modifying fluid to a polyolefin composition comprising only polypropylene homopolymer tends to decrease the nucleation density, increase the spherulite size, but have very little affect on the thickness of the molded skin layer. However, when the impact modifying fluid is added to a polyolefin composition comprising a blend of polypropylene homopolymer and an ethylene-octene copolymer (i.e., a TPO blend), the nucleation density of the material tends to increase, the spherulite size tends to decrease, and the thickness of the molded skin layer tends to decrease. Thus, it appears that in case of polyolefin homopolymers, the reduction in the degree of crystallinity of the polymer caused by the addition of the impact modifying fluid plays an important role in improving the impact strength of the material. But, in the case of TPO blends, the reduction in nucleation density and crystallite size play a more important role in increasing the impact strength.

Addition of the impact modifying fluid also introduces an additional secondary transition at lower temperatures. It is believed that high impact strength materials have prominent low temperature damping peaks due to either the motions of the shorter main chain segments than those involved in the primary transitions, the crankshaft rotation of short methylene main chain segments, secondary glass transitions or a second rubbery phase as in high impact polyblends. The secondary phase introduced by the impact modifying fluid of the present invention seems to provide higher impact strength at room temperature.

In view of the foregoing, applicants expected that the addition of the impact modifying fluid according to the invention to binary or multi-phase polymer compositions would improve the Gardner impact strength of such materials. Accordingly, applicants added the impact modifying fluid of the present invention to high impact polystyrene (HIPS), which is a graft copolymer formed by polymerizing styrene monomer and polybutadiene rubber. Because polystyrene and polybutadiene do not easily mix, high impact polystyrene tends to have a continuous glassy polystyrene phase that serves as a matrix for a discontinuous secondary polybutadiene rubber phase (i.e., a binary system). As expected, addition of the impact modifying fluid according to the invention to high impact polystyrene did increase the Gardner impact strength of the material. For example, the addition of 8% by weight of an impact modifying fluid consisting of a 10:90 by weight ratio of ESTO to mineral oil increased the Gardner impact strength of the HIPS material from 77 in-lbs to >111 in-lbs. Similarly, the addition of 8% by weight of an impact modifying fluid consisting of an 80:20 by weight ratio of ESTO to mineral oil further increased the Gardner impact strength of the HIPS material to 161 in-lbs. However, addition of the impact modifying fluid to polystyrene homopolymer, which is not a binary system, did not increase the Gardner impact strength of the material.

To further test the theory that the effectiveness of the impact modifying fluid appears to be related to polymer morphology and the existence of a secondary phase, applicants added the impact modifying fluid according to the invention to high impact polyvinylchloride (PVC), which is a binary polymer system, and PVC homopolymer. Again, improvements in Gardner impact strength were observed in the high impact PVC material, but not in the PVC homopolymer. Thus, applicants believe that the impact modifying fluid according to the invention would be suitable for use in increasing the Gardner impact strength of other binary and multi-phase polymer systems (e.g., acrylonitrile-butadiene-styrene, impact modified polymer blends, and rubbery graft and/or block copolymers).

To further test the theory that the effectiveness of the impact modifying fluid appears to be related to its capacity to form a secondary phase, applicants added the impact modifying fluid according to the invention to nylon-6,6. Nylon-6,6 is a highly-crystalline polymer with excellent strength and stiffness, but typically poor resistance to impact. It is conventional practice to improve the impact resistance of nylon-6,6 by dispersing rubbery polymers in the nylon (see, e.g., Epstein, U.S. Pat. No. 4,174,358), forming what is called "impact-modified" nylon. This substantially improves the impact resistance of the composition, but with significant loss in strength and stiffness, typically 30–40%. When the impact modifying fluid according to the invention is added to unmodified nylon-6,6, a composition is obtained with substantially the same Gardner impact resistance both at room temperature and at −40° C. as commercial impact-modified nylon, but with little (less than 5%) or no change in strength and stiffness. Thus, the applicants believe that the impact-modifying fluid according to the invention functions by a similar mechanism to rubber modification in nylon-6,6, but more efficiently.

The following examples are intended only to illustrate the invention and should not be construed as imposing limitations upon the claims.

EXAMPLE 1

Polyolefin Compositions A and B were formed by blending the components shown in weight percent in Table 2 below:

TABLE 2

| COMPONENT | A | B |
| --- | --- | --- |
| PETROTHENE 51S12A | 97.75 | 95.75 |
| POLYBOND 3200 | 2.00 | 2.00 |
| IRGANOX B225 | 0.25 | 0.25 |
| TWEEN 85 | — | 2.00 |
| TOTAL | 100.00 | 100.00 |

PETROTHENE PP 51S12A is a 12 melt flow index (MFI) polypropylene homopolymer available from Equistar Chemicals, LP. POLYBOND 3200 is a maleic anhydride grafted polypropylene available from Crompton Corporation. IRGANOX B225 is a thermal stabilizer available from Ciba Specialty Chemicals, Inc. TWEEN 85 is an ethoxylated sorbitan trioleate ("ESTO") available from ICI Americas, Inc.

In Polyolefin Composition B, ESTO was added by gear pump at a port near the feed throat of a co-rotating twin-screw extruder. No ESTO was added to Polyolefin Composition A, which was a comparative control. Polyolefin Compositions A and B were each separately extruded, pelletized and then injection molded and tested. The results of standardized testing are reported in Table 3 below:

TABLE 3

| Property | Test Standard | A | B |
|---|---|---|---|
| Tensile Strength (psi) | ASTM D 638 | 5290 ± 83 | 4825 ± 46 |
| Tensile Yield strain (%) | ASTM D 638 | 3.5 ± 2.4 | 6 ± 2 |
| Tensile Break Strain (%) | ASTM D 638 | 9.5 ± 3 | 14 ± 2 |
| Young's Modulus ($10^5$ psi) | ASTM D 638 | 1.8 ± 1.4 | 3.0 ± 0.9 |
| Flex Strength (psi) | ASTM D 790 | 8004 ± 132 | 7610 ± 150 |
| Flex Modulus ($10^5$ psi) | ASTM D 790 | 2.7 ± 0.1 | 2.7 ± 0.2 |
| Notched Izod at 23° C. for 1/8" bar (ft-lb/in) | ASTM D 256 | 0.5 ± 0.1 | 0.6 ± 0.1 |
| Heat Deflection Temperature at 264 psi (° C.) | ASTM D 648 | 62 ± 1 | 60 ± 1 |
| Heat Deflection Temperature at 66 psi (° C.) | ASTM D 648 | 95 ± 1 | 94 ± 1 |
| Gardner Impact at 23° C. (in-lbs) | ASTM D 5420 | 10 ± 1 | 29 ± 12 |
| MFI at 230° C. (g/10 min) | ASTM D 1238 | 12 | 15 |

EXAMPLE 2

Polyolefin Compositions C, D, E and F were formed by blending the components shown in weight percent in Table 4 below:

TABLE 4

| COMPONENT | C | D | E | F |
|---|---|---|---|---|
| PETROTHENE 51S12A | 97.25 | 96.75 | 93.75 | 91.75 |
| POLYBOND 3200 | 2.00 | 2.00 | 2.00 | 2.00 |
| IRGANOX B225 | 0.25 | 0.25 | 0.25 | 0.25 |
| TWEEN 85 | 0.50 | 1.00 | 4.00 | 6.00 |
| TOTAL | 100.00 | 100.00 | 100.00 | 100.00 |

In Polyolefin Compositions C, D, E and F, the ESTO was added by gear pump at a port near the feed throat of a co-rotating twin-screw extruder. Polyolefin Compositions C, D, E and F were each separately extruded, pelletized and then injection molded and tested. The results of standardized testing are reported in Table 5 below:

TABLE 5

| Property | C | D | E | F |
|---|---|---|---|---|
| Tensile Strength (psi) (ASTM D 638) | 5075 ± 33 | 5005 ± 29 | 4675 ± 50 | 4590 ± 62 |
| Tensile Yield strain (%) (ASTM D 638) | 7.6 ± 0.4 | 4.2 ± 2.0 | 5.6 ± 1.5 | 6.5 ± 0.2 |
| Tensile Break Strain (%) (ASTM D 638) | 14.4 ± 1.1 | 10.1 ± 2.1 | 15.9 ± 2.8 | 15.6 ± 4.0 |
| Young's Modulus ($10^5$ psi) (ASTM D 638) | 5.2 ± 1.5 | 1.6 ± 0.9 | 3.4 ± 1.5 | 2.7 ± 0.2 |
| Flex Strength (psi) (ASTM D 790) | 7707 ± 153 | 7744 ± 216 | 7172 ± 129 | 7062 ± 177 |
| Flex Modulus ($10^5$ psi) (ASTM D 790) | 2.6 ± 0.1 | 2.6 ± 0.1 | 2.5 ± 0.1 | 2.4 ± 0.1 |
| HDT at 264 psi (° C.) (ASTM D 648) | 61 ± 1 | 62 ± 1 | 61 ± 1 | 61 ± 1 |
| HDT at 66 psi (° C.) (ASTM D 648) | 94 ± 1 | 97 ± 1 | 94 ± 1 | 94 ± 1 |
| Gardner Impact at 23° C. (in-lbs) (ASTM D 5420) | 10.3 ± 3.8 | 15.5 ± 1.2 | 38.8 ± 13.9 | 32.5 ± 10.4 |
| MFI at 230° C. (g/10 min) (ASTM D 1238) | 13 | 14 | 15.6 | 16.4 |

Example 2 shows that the loss of flexural modulus accompanying an increase in Gardner impact strength is about 550 psi/in-lb when ESTO alone is added to the polymer.

EXAMPLE 3

Polyolefin Compositions G, H and J were formed by blending the components shown in weight percent in Table 6 below:

TABLE 6

| COMPONENT | G | H | J |
|---|---|---|---|
| PETROTHENE 31S3A | 99.75 | 91.75 | 93.75 |
| IRGANOX B225 | 0.25 | 0.25 | 0.25 |
| DRAKEOL 34 NF | — | 8.00 | 6.00 |
| TOTAL | 100.00 | 100.00 | 100.00 |

PETROTHENE 31S3A is a 3 MFI polypropylene homopolymer available from Equistar Chemicals, LP. DRAKEOL 34 NF is a light mineral oil available from Penreco.

In Polyolefin Compositions H and J, mineral oil was added by gear pump at a port near the feed throat of a co-rotating twin-screw extruder. No mineral oil was added to Polyolefin Composition G, which was a comparative control. Polyolefin Compositions G, H and J were each separately extruded, pelletized and then injection molded and tested. The results of standardized testing are reported in Table 7 below:

TABLE 7

| Property | G | H | J |
|---|---|---|---|
| Tensile Strength (psi) (ASTM D 638) | 5198 ± 107 | 4653 ± 330 | 4438 ± 30 |
| Tensile Yield strain (%) (ASTM D 638) | 7.9 ± 0.4 | 12.1 ± 2.2 | 13.1 ± 0.2 |
| Tensile Break Strain (%) (ASTM D 638) | 111 ± 42 | 128 ± 15 | 158 ± 17 |

TABLE 7-continued

| Property | G | H | J |
|---|---|---|---|
| Young's Modulus ($10^5$ psi) (ASTM D 638) | 3.0 ± 0.4 | 2.1 ± 0.4 | 1.8 ± 0.1 |
| Flex Strength (psi) (ASTM D 790) | 7781 ± 242 | 5621 ± 82 | 5943 ± 141 |
| Flex Modulus ($10^5$ psi) (ASTM D 790) | 2.6 ± 0.1 | 1.7 ± 0.1 | 1.9 ± 0.1 |
| Notched Izod at 23° C. for 1/8" bar (ft-lb/in) (ASTM D 256) | 0.8 ± 0.1 | 1.0 ± 0.3 | 09. ± 0.2 |
| No Notch (ftlb/in) (ASTM D 4812-99) | 19.8 ± 2.9 | >30 | >29 |
| HDT at 264 psi (° C.) (ASTM D 648) | 60 ± 1 | 56 ± 1 | 56 ± 1 |
| HDT at 66 psi (° C.) (ASTM D 648) | 95 ± 1 | 78 ± 1 | 80 ± 1 |
| Gardner Impact at 23° C. (in-lbs) (ASTM D 5420) | 6 ± 1 | 151 ± 10 | 159 ± 6 |
| Gardner Impact at −40° C. (in-lbs) (ASTM D 5420) | <2 | <2 | <2 |
| MFI at 230° C. (g/10 min) (ASTM D 1238) | 4.9 | 6.3 | 9.5 |

Example 3 shows that the loss of flexural modulus accompanying an increase in Gardner impact strength is about 5510 psi/in-lb when mineral oil alone is added to the polymer.

EXAMPLE 4

Polyolefin Compositions L and M were formed by blending the components shown in weight percent in Table 8 below:

TABLE 8

| COMPONENT | L | M |
|---|---|---|
| PETROTHENE 51S12A | 91.75 | 89.75 |
| POLYBOND 3200 | 2.00 | 2.00 |
| IRGANOX B225 | 0.25 | 0.25 |
| DRAKEOL 34 NF | 5.40 | 7.20 |
| TWEEN 85 | 0.60 | 0.80 |
| TOTAL | 100.00 | 100.00 |

In Polyolefin Compositions L and M, the mineral oil and ESTO was blended in a Cowles mixer and then the mixture was added by gear pump at a port near the feed throat of a co-rotating twin-screw extruder. Polyolefin Compositions L and M were each separately extruded, pelletized and then injection molded and tested. The results of standardized testing are reported in Table 9 below (Composition A is the control from Example 1):

TABLE 9

| Property | A | L | M |
|---|---|---|---|
| Tensile Strength (psi) (ASTM D 638) | 5290 ± 83 | 4110 ± 42 | 4035 ± 35 |
| Tensile Yield strain (%) (ASTM D 638) | 3.5 ± 2.4 | 11.4 ± 0.4 | 12.1 ± 0.5 |
| Tensile Break Strain (%) (ASTM D 638) | 9.5 ± 3 | 23.6 ± 6 | 24.3 ± 2.1 |
| Young's Modulus ($10^5$ psi) (ASTM D 638) | 1.8 ± 1.4 | 2.5 ± 0.6 | 1.8 ± 0.2 |
| Flex Strength (psi) (ASTM D 790) | 8004 ± 132 | 5768 ± 112 | 5371 ± 50 |
| Flex Modulus ($10^5$ psi) (ASTM D 790) | 2.7 ± 0.1 | 1.8 ± 0.1 | 1.6 ± 0.1 |
| HDT at 264 psi (° C.) (ASTM D 648) | 62 ± 1 | 58 ± 2 | 58 ± 1 |
| HDT at 66 psi (° C.) (ASTM D 648) | 95 ± 1 | 87 ± 1 | 86 ± 1 |
| Gardner Impact at 23° C. (in-lbs) (ASTM D 5420) | 9.8 ± 1.4 | 126 ± 9 | 137 ± 8 |
| Gardner Impact at −20° C. (in-lbs) (ASTM D 5420) | <2 | <2 | <2 |
| MFI at 230° C. (g/10 min) (ASTM D 1238-00) | 12.4 | 18.6 | 21.2 |

Example 4 shows that the loss of flexural modulus accompanying an increase in Gardner impact strength is about 829 psi/in-lb when a 90:10 (percent by weight) mineral oil:ESTO mixture is added to the polyolefin composition.

EXAMPLE 5

Polyolefin Compositions N, O, P, Q, R and S were formed by blending the components shown in weight percent in Table 10 below:

TABLE 10

| COMPONENT | N | O | P | Q | R | S |
|---|---|---|---|---|---|---|
| PETROTHENE 31S3A | 97.75 | 91.75 | 89.75 | 89.75 | 89.75 | 89.75 |
| POLYBOND 3200 | 2.00 | — | 2.00 | 2.00 | 2.00 | 2.00 |
| IRGANOX B225 | 0.25 | 0.25 | 0.25 | 0.25 | 0.25 | 0.25 |
| TWEEN 85 | — | 4.80 | 1.60 | 4.00 | 3.20 | 6.40 |
| DRAKEOL 7 NF | — | 3.20 | 6.40 | 4.00 | 4.80 | 1.60 |
| TOTAL | 100.00 | 100.00 | 100.00 | 100.00 | 100.00 | 100.00 |

DRAKEOL 7 NF is a light mineral oil available from Penreco.

In Polyolefin Compositions O, P, Q, R and S, the mineral oil and ESTO was blended together in the proper ratios in a Cowles mixer and then the various mixtures were added by gear pump at a port near the feed throat of a co-rotating twin-screw extruder. Polyolefin Compositions N, O, P, Q, R, S and T were each separately extruded, pelletized and then injection molded and tested. The results of standardized testing are reported in Table 11 below:

In Polyolefin Compositions V, the ESTO and mineral oil was blended in a Cowles mixer. In each case, the fluid components were added to the molten polymer by gear pump at a port near the feed throat of a co-rotating twin-screw extruder, as shown in FIG. 1. Polyolefin Compositions A, T, U and V were each separately extruded, pelletized and then injection molded into test bars for standardized testing (Composition A is the "Control" sample from Example 1).

TABLE 11

| Property | N | O | P | Q | R | S |
|---|---|---|---|---|---|---|
| Tensile Strength (psi) (ASTM D 638) | 5234 ± 12 | 4533 ± 53 | 4142 ± 42 | 4403 ± 51 | 4486 ± 47 | 4684 ± 20 |
| Tensile Yield strain (%) (ASTM D 638) | 8.7 ± 0.3 | 10.6 ± 0.2 | 13.4 ± 0.2 | 11.2 ± 0.5 | 11.0 ± 0.3 | 8.6 ± 0.1 |
| Tensile Break Strain (%) (ASTM D 638) | 107 ± 22 | 186 ± 27 | 304 ± 49 | 191 ± 23 | 184 ± 22 | 144 ± 20 |
| Young's Modulus ($10^5$ psi) (ASTM D 638) | 2.6 ± 0.4 | 2.1 ± 0.2 | 1.6 ± 0.1 | 1.7 ± 0.2 | 1.7 ± 0.2 | 2.3 ± 0.1 |
| Flex Strength (psi) (ASTM D 790) | 8236 ± 91 | 6417 ± 44 | 5397 ± 68 | 6074 ± 86 | 6440 ± 98 | 6988 ± 89 |
| Flex Modulus ($10^5$ psi) (ASTM D 790) | 2.8 ± 0.1 | 1.9 ± 0.1 | 1.6 ± 0.1 | 1.9 ± 0.1 | 2.1 ± 0.2 | 2.3 ± 0.1 |
| No Notch (ftlb/in) (ASTM D 4812-99 | 25.2 ± 0.8 | >32 | >32 | >32 | >32 | >30 |
| HDT at 264 psi (° C.) (ASTM D 648) | 59 ± 1 | 56 ± 1 | 55 ± 1 | 54 ± 1 | 55 ± 1 | 58 ± 1 |
| HDT at 66 psi (° C.) (ASTM D 648) | 98 ± 1 | 88 ± 1 | 86 ± 1 | 85 ± 1 | 87 ± 1 | 96 ± 1 |
| Gardner Impact 23° C. (in-lbs) (ASTM D 5420) | 9.2 ± 7 | 229 ± 4 | >320 | 272 ± 35 | 231 ± 19 | 227 ± 6 |
| Gardner Impact −20° C. (in-lbs) (ASTM D 5420) | <2 | <2 | <2 | <2 | <2 | <2 |
| MFI at 230° C. (g/10 min) (ASTM D 1238-00) | 4.2 | 7.5 | 7.1 | 7 | 6.8 | 6.2 |

The results from Example 5 show that addition of the impact modifying fluid according to the invention to polypropylene homopolymer does not significantly degrade desired stiffness and strength, but provides improved Gardner impact strength, particularly at room temperature, that heretofore could only be obtained through the use of expensive copolymers. Polyolefin composition P is particularly superior in this respect. Example 5 shows that the loss of flexural modulus accompanying an increase in Gardner impact strength is about 216 psi/in-lb when mineral oil and ESTO are added to the polymer.

EXAMPLE 6

Polyolefin Compositions T, U and V were formed by blending the components shown in weight percent in Table 12 below:

TABLE 12

| COMPONENT | A | T | U | V |
|---|---|---|---|---|
| PETROTHENE 51S12A | 97.75 | 96.15 | 91.35 | 89.75 |
| POLYBOND 3200 | 2.00 | 2.00 | 2.00 | 2.00 |
| IRGANOX B225 | 0.25 | 0.25 | 0.25 | 0.25 |
| TWEEN 85 | — | 1.60 | — | 1.60 |
| DRAKEOL 34 | — | — | 6.40 | 6.40 |
| TOTAL | 100.00 | 100.00 | 100.00 | 100.00 |

Figure 2:
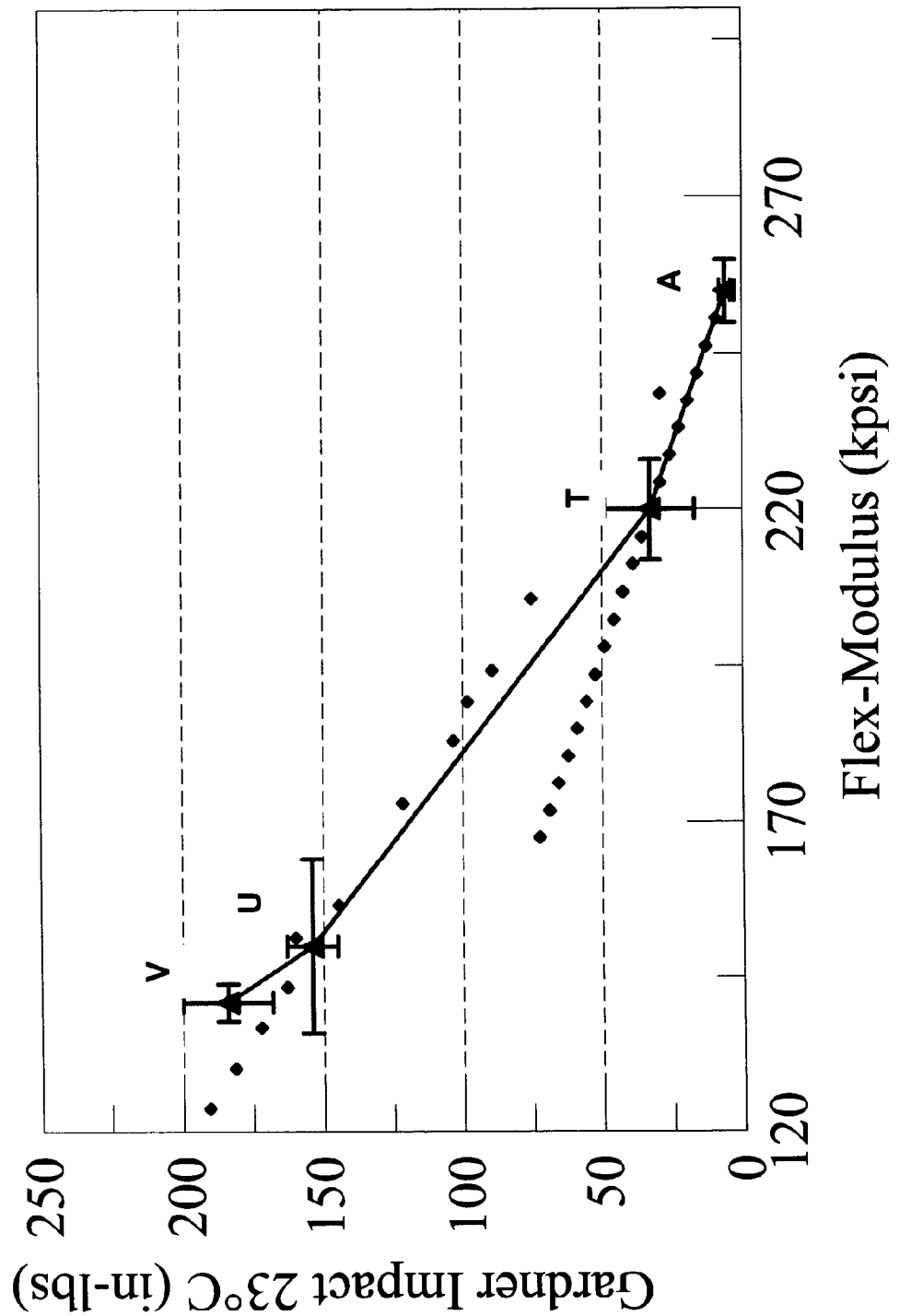
FIG. 2 shows the stiffness-impact tradeoff afforded by use of various impact modifying fluids according to the invention.
Figure 4:
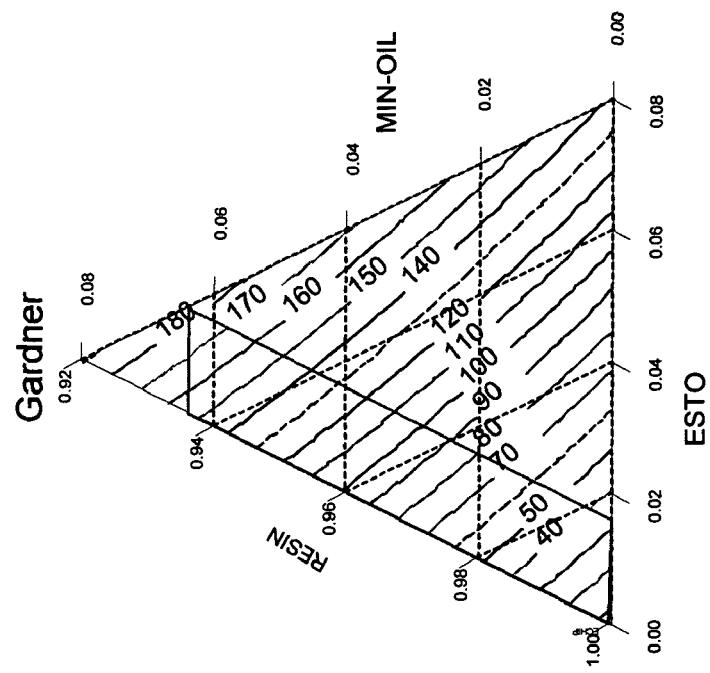
FIG. 4 shows a Gardner impact contour for polypropylene homopolymer blended with 0 to 8% of a nonionic surfactant and/or mineral oil.
Figure 3:
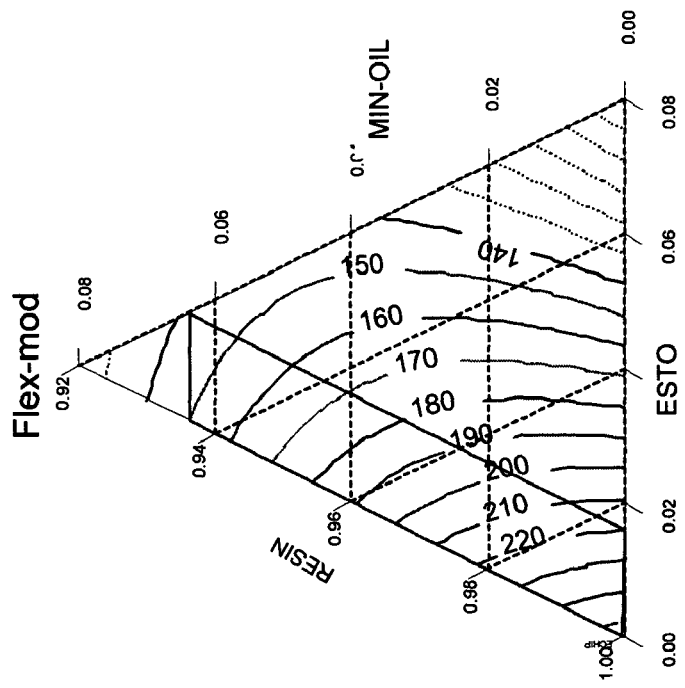
FIG. 3 shows a stiffness contour for polypropylene homopolymer blended with 0 to 8% of a nonionic surfactant and/or mineral oil.
Figures 5, 6:
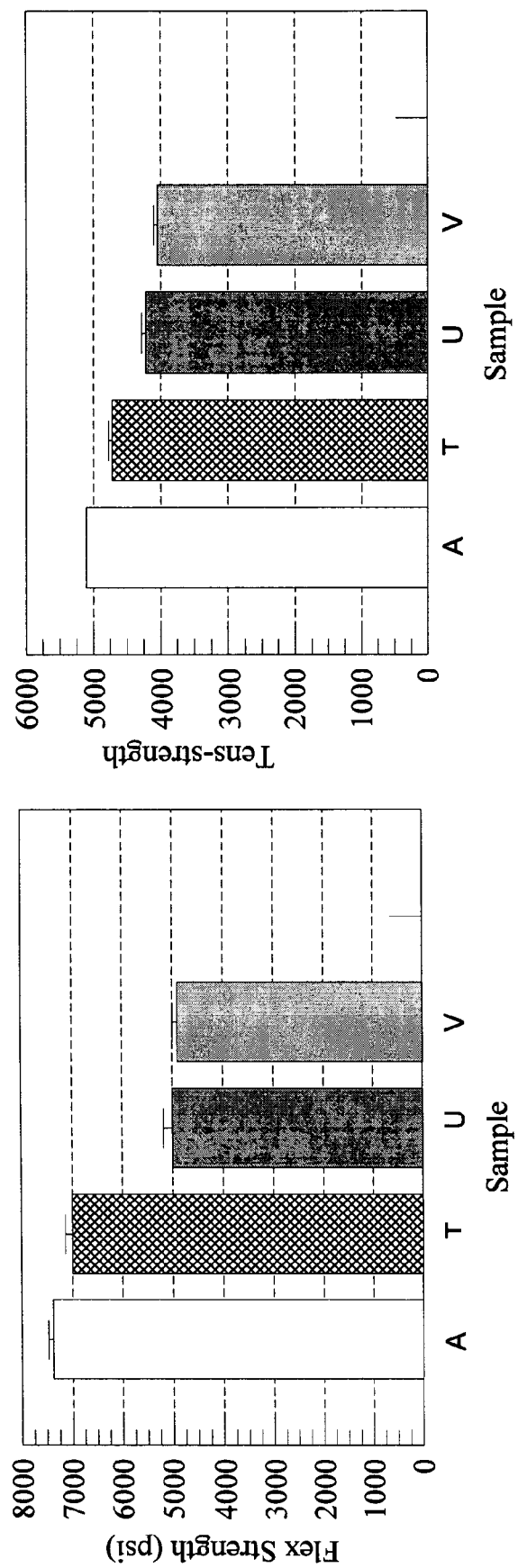
FIG. 5 shows a bar graph of the flexural strength of samples in Example 6.
FIG. 6 shows a bar graph of the tensile strength of samples in Example 6.
Figure 7:
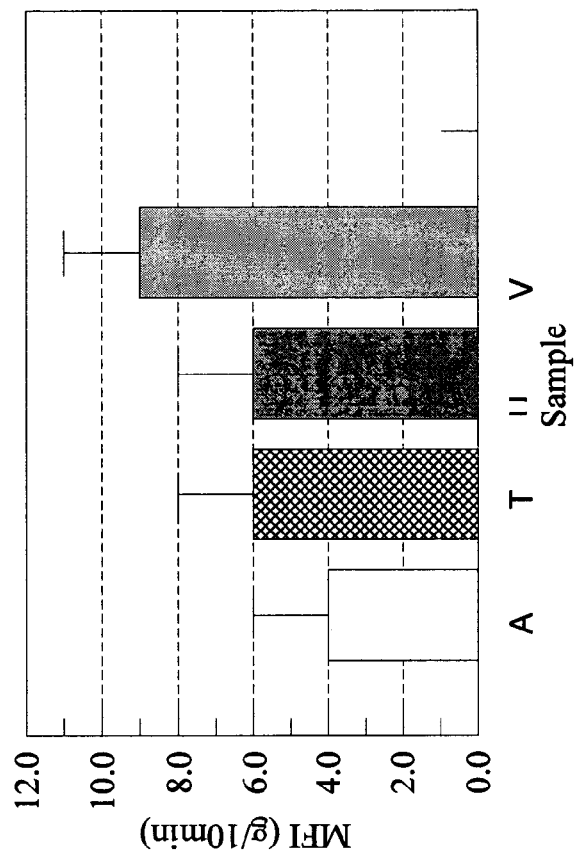
FIG. 7 shows a bar graph of the HDT at 264 psi in ° C. of samples in Example 6.
Figure 8:
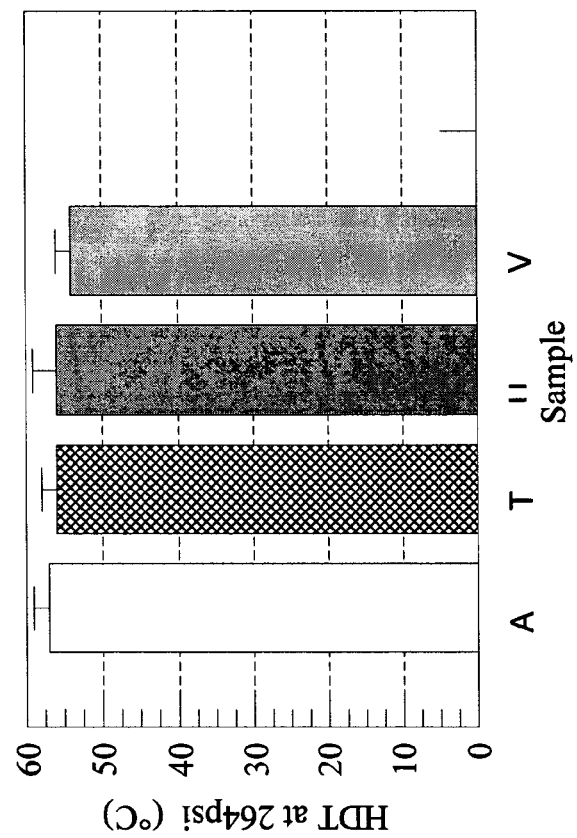
FIG. 8 shows a bar graph of the MFI at 230° C. in g/10 min of samples in Example 6.

FIG. 2 shows the stiffness-impact tradeoff afforded by the samples. The addition of the nonionic surfactant (ESTO) alone (Sample T) improved the Gardner impact strength at 23° C. of the polyolefin composition without significantly degrading its flexural modulus. The addition of mineral oil alone (sample U) significantly improved the Gardner impact strength at 23° C. of the polyolefin composition, but did so at a substantially greater expense of flexural modulus. The combination of ESTO and mineral oil (Sample V), showed that the improvements in Gardner impact strength provided by the nonionic surfactant are additive to any improvements provided by mineral oil alone. FIGS. 3 and 4 show stiffness and impact contours, respectively, for the system (at loadings of 0 to 8% impact modifying fluid). FIGS. 5 and 6 show the effect the various components have on flexural and tensile strength. FIGS. 7 and 8 show the HDT at 264 psi in ° C. and MFI at 230° C. in g/10 min, respectively, of samples A, T, U and V.

The samples were submitted for microscopy analysis. The skin-core structure evident in molded parts was not affected by the presence of the impact modifying fluid. There was significantly more beta-polypropylene crystallinity noted in Sample V than in the other samples (15% estimated in Sample V versus 0% in other samples). However, the overall level of crystallinity did not change (~54±8%). Beta-polypropylene has superior toughness as compared to alpha-polypropylene. There was no change in beta-polypropylene crystallinity before and after impact.

EXAMPLE 7

Polyolefin Composition W was formed by blending the components shown in weight percent in Table 13 below:

TABLE 13

| COMPONENT | W |
| --- | --- |
| PETROTHENE 31S3A | 62.75 |
| POLYBOND 3200 | 2.00 |
| IRGANOX B225 | 0.25 |
| DRAKEOL 7 NF | 31.50 |
| TWEEN 85 | 3.50 |
| TOTAL | 100.00 |

The 90:10 by weight mineral oil:ESTO mixture was added in the same manner as ESTO was added in Example 1 above. Polyolefin Composition W was extruded, pelletized and then injection molded and tested. The results of standardized testing are reported in Table 14 below (Composition N is a control from Example 5):

TABLE 14

| Property | Test Standard | N | W |
| --- | --- | --- | --- |
| Tensile Strength (psi) | ASTM D 638 | 5234 ± 12 | 766 ± 22 |
| Tensile Yield strain (%) | ASTM D 638 | 8.7 ± 0.3 | — |
| Tensile Break Strain (%) | ASTM D 638 | 107 ± 22 | 25.3 ± 2 |
| Young's Modulus ($10^5$ psi) | ASTM D 638 | 2.6 ± 0.4 | 0.26 ± 0.02 |
| Flex Strength (psi) | ASTM D 790 | 8236 ± 91 | 942 ± 82 |
| Flex Modulus ($10^5$ psi) | ASTM D 790 | 2.8 ± 0.1 | 0.06 ± 0.03 |
| No Notch Izod Impact (ftlb/in) | ASTM D 4812-99 | 25.2 ± 0.8 | 2.4 ± 0.4 |
| Heat Deflection Temperature at 264 psi (° C.) | ASTM D 648 | 59 ± 11 | — |
| Heat Deflection Temperature at 66 psi (° C.) | ASTM D 648 | 98 ± 1 | 46 ± 1 |
| Gardner Impact at 23° C. (in-lbs) | ASTM D 5420 | 9.2 ± 7 | 3 ± 2 |
| Gardner Impact at −20° C. (in-lbs) | ASTM D 5420 | <2 | <4 |
| MFI at 230° C. (g/10 min) | ASTM D 1238 | 4.2 | 100 |

Polyolefin Composition W presented no processing problems at this loading, but the material was unusual upon molding. Crystallization was evident as the injection-molded parts were removed from the molder. Upon ejection from the molder, spherulite fronts visibly traversed the four inch samples over the course of about 1 minute's time. The samples solidified to have a clear skin covering an opaque white core. Stress induced whitening could be induced in the skin by bending the sample bars. The stress induced whitening disappeared, however, when the sample bars were bent back to their initial shape. Stress induced whitening is of concern in plastic furniture and in packaging with "live" hinges. Use of impact modified polyolefin compositions in accordance are suitable for use in such applications, and could overcome the stress induced whitening phenomenon. The degree to which this effect is observed is proportional to the level of additive in the formulation.

Polyolefin Composition W, which contains a high loading of the mineral oil and ESTO mixture, can also be used as an impact strength-improving additive (i.e., master batch) in other polyolefin compositions. It will be appreciated that the composition and loading of such master batch formulations can be adjusted to suit particular processing needs.

EXAMPLE 8

Filled Polyolefin Compositions MA, MB, GFA, GFB, TA, TB, CCA and CCB were formed by blending the components shown in weight percent in Table 15 below:

TABLE 15

| COMPONENT | MA | MB | GFA | GFB | TA | TB | CCA | CCB |
| --- | --- | --- | --- | --- | --- | --- | --- | --- |
| PETROTHENE 31S3A | 87.75 | 77.75 | 87.75 | 77.75 | 87.75 | 77.75 | 87.75 | 77.75 |
| TWEEN 85 | — | 9.00 | — | 9.00 | — | 9.00 | — | 9.00 |
| DRAKEOL 34 NF | — | 1.00 | — | 1.00 | — | 1.00 | — | 1.00 |
| POLYBOND 3200 | 2.00 | 2.00 | 2.00 | 2.00 | 2.00 | 2.00 | 2.00 | 2.00 |
| IRGANOX B225 | 0.25 | 0.25 | 0.25 | 0.25 | 0.25 | 0.25 | 0.25 | 0.25 |
| MICA | 10.00 | 10.00 | — | — | — | — | — | — |
| GLASS FIBER | — | — | 10.00 | 10.00 | — | — | — | — |
| TALC | — | — | — | — | 10.00 | 10.00 | — | — |
| CALCIUM CARBONATE | — | — | — | — | — | — | — | 10.00 |
| TOTAL | 100.00 | 100.00 | 100.00 | 100.00 | 100.00 | 100.00 | 100.00 | 100.00 |

The mica used was POLYMICA Grade PM-325 available from Oglebay Norton. The glass fiber used was CRATEC 144A-17C available from Owens Corning Fiberglass. The talc used was grade 9103 available from Polar Minerals. The calcium carbonate used was IMERYS SUPERCOAT available from ECC America.

The mineral oil:ESTO mixture was added in the same manner as ESTO was added in Example 1 above. In each case, the material was extruded, pelletized, and then injection molded and tested. The results of standardized testing are reported in Table 16 below:

TABLE 16

| Property | MA | MB | GFA | GFB | TA | TB | CCA | CCB |
|---|---|---|---|---|---|---|---|---|
| Tensile Strength (psi) ASTM D 638 | 5491 ± 29 | 3866 ± 14 | 7985 ± 55 | 5870 ± 15 | 5542 ± 20 | 4266 ± 18 | 4953 ± 28 | 3884 ± 71 |
| Tensile Yield strain (%) ASTM D 638 | 5.6 ± 0.1 | 12.1 ± 0.3 | 3.8 ± 0.1 | 4.3 ± 0.2 | 5.6 ± 0.1 | 11.2 ± 0.3 | 7.0 ± 0.2 | 12.6 ± 0.7 |
| Tensile Break Strain (%) ASTM D 638 | 22.5 ± 2.1 | 45.2 ± 2.7 | 4.2 ± 0.2 | 4.8 ± 0.2 | 38.7 ± 7.8 | 83 ± 8 | 82 ± 22 | 184 ± 41 |
| Young's Modulus ($10^5$ psi) ASTM D 638 | 3.7 ± 0.4 | 2.0 ± 0.3 | 5.3 ± 0.5 | 3.7 ± 0.4 | 3.7 ± 0.2 | 2.2 ± 0.3 | 2.8 ± 0.2 | 2.0 ± 0.3 |
| Flex Strength (psi) ASTM D 790 | 8649 ± 74 | 5267 ± 33 | 12791 ± 142 | 8919 ± 40 | 9715 ± 52 | 6164 ± 159 | 8199 ± 71 | 5142 ± 64 |
| Flex Modulus ($10^5$ psi) ASTM D 790 | 3.6 ± 0.1 | 1.8 ± 0.1 | 4.6 ± 0.3 | 3.1 ± 40 | 3.9 ± 0.1 | 2.1 ± 0.1 | 3.0 ± 0.1 | 1.5 ± 0.1 |
| HDT at 264 psi (° C.) ASTM D 648 | 65 ± 1 | 54 ± 1 | 123 ± 1 | 99 ± 1 | 67 ± 1 | 57 ± 1 | 61 ± 1 | 55 ± 1 |
| HDT at 66 psi (° C.) ASTM D 648 | 115 ± 2 | 93 ± 1 | 156 ± 1 | 145 ± 1 | 126 ± 1 | 112 ± 1 | 100 ± 1 | 87 ± 1 |
| Gardner Impact 23° C. (in-lbs) ASTM D 5420 | 4 ± 1 | 19 ± 5 | 4 ± 1 | 3 ± 1 | 5 ± 1 | 37 ± 6 | 5 ± 1 | 52 ± 6 |
| Gardner Impact −20° C. (in-lbs) ASTM D 5420 | 3 ± 1 | 5 ± 3 | 3 ± 1 | 3 ± 1 | 3 ± 1 | 5 ± 2 | <2 | 4 ± 1 |

The glass fiber-filled composition (Filled Polyolefin Composition GFB) showed property degradation as compared to a control (Filled Polyolefin Composition GFA), but the mica-filled composition (Filled Polyolefin Composition MB), the talc-filled composition (Filled Polyolefin Composition TB), and the calcium carbonate-filled composition (Filled Polyolefin Composition CCB) showed improved Gardner impact strength at 23° C. as compared to control samples (Filled Polyolefin Compositions MA, TA and CCA, respectively) that did not contain the mineral oil:ESTO mixture. The greatest synergy occurred in talc and calcium carbonate filled samples (Filled Polyolefin Compositions TB and CCB). For many applications, the increased break strain (ASDM D 638-00) achieved by adding mineral oil and ESTO yields an advantage.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. An impact modified polyolefin composition comprising a polyolefin homopolymer resin and an impact modifying fluid comprising a nonionic surfactant and a diluent selected from the group consisting of mineral oil and polybutene, wherein the impact modified polyolefin composition has a Gardner impact strength of 100 in-lbs or greater as measured in accordance with ASTM D 5420.

2. The impact modified polyolefin composition according to claim 1 wherein the nonionic surfactant is selected from the group consisting of ethoxylated ethers, ethoxylated alkylphenols, ethoxylated aryl phenols and ethoxylated sorbitan fatty acid esters.

3. The impact modified polyolefin composition according to claim 1 wherein the nonionic surfactant is an ethoxylated sorbitan fatty acid ester selected from the group consisting of polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate and polyoxyethylene sorbitan trioleate.

4. The impact modified polyolefin composition according to claim 1 wherein the polyolefin homopolymer resin is a polypropylene homopolymer.

5. The impact modified polyolefin composition according to claim 1 wherein the impact modified polyolefin composition has a flexural modulus of 40 kpsi or greater as measured in accordance with ASTM D 790.

6. The impact modified polyolefin composition according to claim 1 wherein the impact modified polyolefin composition has a tensile modulus of 60 kpsi or greater as measured in accordance with ASTM D 638.

7. An impact modified polyolefin composition comprising a homopolymer of polypropylene and from about 2% to about 8% by weight of an impact modifying fluid comprising polyoxyethylene sorbitan trioleate and mineral oil, wherein the ratio of polyoxyethylene sorbitan trioleate to mineral oil in the impact modifying fluid is from about 10:90 to about 99:1, wherein the impact modified polyolefin composition has a Gardner impact strength of 100 in-lbs or greater as measured in accordance with ASTM D 5420.

8. The impact modified polyolefin composition according to claim 7 wherein the impact modified polyolefin composition has a flexural modulus of 40 kpsi or greater as measured in accordance with ASTM D 790.

9. The impact modified polyolefin composition according to claim 7 wherein the impact modified polyolefin composition has a tensile modulus of 60 kpsi or greater as measured in accordance with ASTM D 638.

10. An impact modifier for use in polyolefins comprising a mixture of an ethoxylated sorbitan fatty acid ester and mineral oil, wherein the ratio of ethoxylated sorbitan fatty acid ester to mineral oil is within the range of from 5:95 to about 99:1.

11. The impact modifier according to claim 10 wherein the ethoxylated sorbitan fatty acid ester is selected from the group consisting of polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate and polyoxyethylene sorbitan trioleate.

12. A method of forming an injection moldable polyolefin composition exhibiting a Gardner impact strength of 100 in-lbs or greater as measured in accordance with ASTM D 5420 comprising: providing a polyolefin composition comprising a blend of one or more polyolefin homopolymer resins, from about 2.0% to about 8.0% by weight of one or more nonionic surfactants and a diluent selected from the group consisting of mineral oil and polybutene; heating the polyolefin composition to form a flowable melt; injecting the flowable melt into a mold to form a part; and removing the part from the mold.

13. The method according to claim 12 wherein the nonionic surfactant is selected from the group consisting of ethoxylated ethers, ethoxylated alkylphenols, ethoxylated aryl phenols and ethoxylated sorbitan fatty acid esters.

* * * * *